US007653717B2

(12) United States Patent
Tomita

(10) Patent No.: US 7,653,717 B2
(45) Date of Patent: Jan. 26, 2010

(54) EQUIPMENT MANAGEMENT APPARATUS, EQUIPMENT MANAGEMENT SYSTEM, AND EQUIPMENT MANAGEMENT METHOD

(75) Inventor: Atsushi Tomita, Toyohashi (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 745 days.

(21) Appl. No.: 09/810,489

(22) Filed: Mar. 19, 2001

(65) Prior Publication Data

US 2002/0002610 A1 Jan. 3, 2002

(30) Foreign Application Priority Data

Mar. 23, 2000 (JP) ............................ 2000-081417

(51) Int. Cl.
*G06F 15/173* (2006.01)

(52) U.S. Cl. ............................ 709/224; 714/48; 399/8

(58) Field of Classification Search ......... 709/223-224, 709/220-222, 227-228, 217; 358/1.15; 714/48, 714/100, 47; 399/8

See application file for complete search history.

(56) References Cited

U.S. PATENT DOCUMENTS

| | | | | |
|---|---|---|---|---|
| 5,184,179 | A | 2/1993 | Tarr et al. | |
| 5,220,380 | A * | 6/1993 | Hirata et al. | 399/8 |
| 5,517,282 | A * | 5/1996 | Yamashita et al. | 399/10 |
| 5,757,643 | A * | 5/1998 | Kuroda et al. | 700/9 |
| 5,859,778 | A * | 1/1999 | Kuroda et al. | 700/169 |
| 6,003,078 | A * | 12/1999 | Kodimer et al. | 709/224 |
| 6,032,001 | A * | 2/2000 | Miyawaki | 399/8 |
| 6,308,205 | B1 * | 10/2001 | Carcerano et al. | 709/221 |
| 6,330,611 | B1 * | 12/2001 | Itoh et al. | 709/229 |

(Continued)

FOREIGN PATENT DOCUMENTS

JP 01-205376 8/1989

(Continued)

OTHER PUBLICATIONS

Japanese Official Action from corresponding Japanese Application No. 2001-074360, mailed on Jul. 22, 2008 (with English translation).

(Continued)

*Primary Examiner*—Salad Abdullahi
(74) *Attorney, Agent, or Firm*—Buchanan Ingersoll & Rooney PC

(57) ABSTRACT

When a trouble has occurred in any one or more of copying machines, a data terminal (i.e. an equipment management apparatus) transmits to the computer of the management center the trouble data and the management data about the copying machines in which no trouble has occurred. Therefore, the management data about a plurality of copying machines can be efficiently transmitted to the computer of the management center. The copying machine of which management data is to be transmitted together with the trouble data is determined in accordance with the count number remaining until the time for the next regular maintenance comes. As a result, the management data about the copying machine which is scheduled to have regular maintenance in a near future can be transmitted to the computer of the management center prior to other data. The management center can know which copying machine is scheduled to have maintenance in a near future. As a result, a service engineer can be efficiently dispatched.

17 Claims, 10 Drawing Sheets

U.S. PATENT DOCUMENTS

| | | | | |
|---|---|---|---|---|
| 6,385,497 | B1 * | 5/2002 | Ogushi et al. | 700/110 |
| 6,415,392 | B1 * | 7/2002 | Suzuki et al. | 714/27 |
| 6,430,711 | B1 * | 8/2002 | Sekizawa | 714/47 |
| 6,434,593 | B1 * | 8/2002 | Mikata et al. | 709/200 |
| 6,516,347 | B1 * | 2/2003 | Nakamura | 709/221 |
| 6,539,422 | B1 * | 3/2003 | Hunt et al. | 709/217 |
| 6,631,407 | B1 * | 10/2003 | Mukaiyama et al. | 709/223 |
| 6,654,135 | B2 * | 11/2003 | Mitani | 358/1.15 |
| 6,701,364 | B1 * | 3/2004 | Meyer | 709/224 |
| 6,718,376 | B1 * | 4/2004 | Chu et al. | 709/223 |
| 6,757,850 | B1 * | 6/2004 | Lehner | 714/48 |
| 6,832,250 | B1 * | 12/2004 | Coons et al. | 709/224 |
| 6,871,224 | B1 * | 3/2005 | Chu et al. | 709/224 |
| 6,912,071 | B1 * | 6/2005 | Rasmussen et al. | 358/406 |
| 2002/0018681 | A1 * | 2/2002 | Kageyama | 400/61 |

FOREIGN PATENT DOCUMENTS

| | | |
|---|---|---|
| JP | 05-054054 | 3/1993 |
| JP | 09-261550 | 3/1997 |
| JP | 09-130831 | 5/1997 |
| JP | 10-190596 | 7/1998 |
| JP | 11-045363 | 2/1999 |
| JP | 11-120416 | 4/1999 |
| JP | 11-134143 | 5/1999 |

OTHER PUBLICATIONS

Japanese Official Action from corresponding Japanese Application No. 2001-074360, mailed on Oct. 21, 2008 (with English translation).

Japanese Office Action dated Mar. 3, 2009, along with English language translation of Japanese Office Action.

* cited by examiner

FIG.3

| | | | | | | | |
|---|---|---|---|---|---|---|---|
| b7 | b6 | b5 | b4 | b3 | b2 | b1 | b0 |

PAPER EJECTING CODE : FALL OF b0
JAM OCURRING CODE : b7=1, b6=0
TROUBLE OCURRING CODE : b7=1,b6=1

(PROCESSING FOR DATA TRANSMISSION IN S617)

(S617 IN ACCORDANCE WITH SECOND EM BODIMENT)

EQUIPMENT MANAGEMENT APPARATUS, EQUIPMENT MANAGEMENT SYSTEM, AND EQUIPMENT MANAGEMENT METHOD

This application is based on Application No. 2000-081417 filed in Japan, contents of which is hereby incorporated by reference.

BACKGROUND OF THE INVENTION

1. Field of the Invention

The present invention relates to an equipment management apparatus for performing a centralized management of a plurality of equipment, an equipment management system, and an equipment management method. More specifically, the present invention relates to an equipment management apparatus which collects management information from a plurality of equipment, and transmits the collected management information to a centralized management center via communication lines, an equipment management system including the equipment management apparatus and the centralized management apparatus of the centralized management center, and an equipment management method which is carried out by use of these apparatuses.

2. Description of the Related Art

Conventionally, there has been known equipment management system in which centralized management is performed for a plurality of equipment by a centralized management center via communication lines. As such equipment management system, known is a system in which, instead of providing a communication line to each of a plurality of equipment, the plurality of equipment are all together connected to one equipment management apparatus, and the equipment management apparatus is connected to the centralized management center via one communication line. Information about expendables and information about trouble or the like are transmitted from each of equipment to the centralized management center via the equipment management apparatus. Based on the information, the centralized management center performs centralized management for each of equipment.

In the conventional equipment management system such as described above, each information transmitted from each of equipment is managed independently of each other. Therefore, one signal transmission from the equipment management apparatus is performed on information about single equipment. If an increased number of equipment is connected to the equipment management apparatus, the number of signal transmissions from the equipment management apparatus is increased accordingly. In this case, there arises a problem that the processing in the centralized management center is complicated, and increased fee is required for using the communication lines. In addition, there may arise another problem as follows. When a trouble has occurred in one of the plurality of equipment, a service engineer is dispatched to deal with the trouble. In this case, if there arises a necessity of maintenance for another equipment immediately after the dispatch of the service engineer, the service engineer must be dispatched again for the maintenance of another equipment.

In addition, since a plurality of equipment are connected to one equipment management apparatus, there may be a case where, after the equipment management apparatus receives information from each of the plurality of equipment, the timings of transmitting the plural pieces of information from the equipment management apparatus to the centralized management center are overlapped (i.e. become simultaneous). In the conventional management system, it may be impossible to assign higher priority to information with more importance and information with higher urgency over other information, and therefore, may be impossible to transmit such information to the centralized management center prior to other information.

SUMMARY OF THE INVENTION

The present invention has been made to solve the above-described problems residing in the prior art, and the objective thereof is to provide: an equipment management apparatus capable of efficiently transmitting information from a plurality of equipment to the centralized management center, and thereby reducing the number of times of dispatching service engineers; an equipment management system including the equipment management apparatus; and the equipment management method. It is another objective of the present invention to provide: an equipment management apparatus capable of assigning higher priority to information with more importance and information with higher urgency over other information, and transmitting such information to the centralized management center prior to other information; an equipment management system including the equipment management apparatus; and the equipment management method.

In an aspect of the present invention, an equipment management apparatus for transmitting management information collected from a plurality of equipment to a centralized management apparatus, includes:

a detector for detecting a trouble which has occurred in first equipment; and a transmission controller for, when the trouble is detected by the detector, transmitting management information about second equipment which is other than the first equipment together with the trouble information about the first equipment to the centralized management apparatus.

In the equipment management apparatus, the detector provided to the equipment management apparatus detects whether or not a trouble has occurred in the first equipment. The first equipment is arbitrary equipment among the plurality of equipment. When the detector detects a trouble in the first equipment, the transmission controller transmits to the centralized management apparatus, together with the trouble information about the first equipment, the management information about the second equipment other than the first equipment. In this manner, both the trouble information about equipment and the management information about the equipment other than equipment in which the trouble has occurred can be recognized by the centralized management apparatus. Therefore, it becomes possible to collect the management information about each of the equipment through one trouble transmission. As a result, the conditions of each of the equipment can be managed in further detail, thereby conducting effective maintenance. In addition, since the management information about each of the equipment is transmitted through one trouble transmission, the fixed time transmission and the closing date transmission scheduled at the next time can be omitted. As a result, the number of communications can be reduced.

Furthermore, it is possible to know whether or not the second equipment will need maintenance in a near future from the management information about the second equipment. If the second equipment will need maintenance in a near future, at the time when a service engineer is dispatched to deal with the trouble of one of the equipment, the service engineer can take preventive maintenance for the second equipment. This arrangement eliminates the necessity of dispatching service engineers many times.

In another aspect of the present invention, an equipment management system includes an equipment management apparatus for transmitting management information collected from a plurality of equipment, and a centralized management apparatus for managing each of the plurality of equipment based on the management information transmitted from the equipment management apparatus, wherein the equipment management apparatus comprises:

a detector for detecting a trouble which has occurred in first equipment; and a transmission controller for, when the trouble is detected by the detector, transmitting management information about second equipment which is other than the first equipment together with the trouble information about the first equipment to the centralized management apparatus.

In still another aspect of the present invention, an equipment management method in which one equipment management apparatus collects management information about a plurality of equipment, and the equipment management apparatus transmits the management information to a centralized management apparatus so as to manage the plurality of equipment, includes steps of:

a step 1 of detecting a trouble which has occurred in first equipment by use of the equipment management apparatus; and a step 2 of transmitting management information about second equipment which is other than the first equipment from the equipment management apparatus to the centralized management apparatus together with the trouble information about the first equipment, when the trouble is detected in the step 1.

By use of the equipment management system or the equipment management method, as described above, it is also possible to collect the management information about each of the equipment into the centralized management apparatus through one trouble transmission from the first equipment. In this manner, the conditions of each of the equipment can be managed in further detail. In addition, the trouble transmission from the first equipment makes it possible to eliminate the fixed time transmission and the closing date transmission scheduled at the next time. As a result, the number of communications can be reduced.

In still another aspect of the present invention, an equipment management apparatus for transmitting management information collected from a plurality of equipment to a centralized management apparatus, includes:

a first judging device for judging whether or not it is the time of transmitting information about a first equipment;

a second judging device for judging whether or not it is the time of transmitting the information about second equipment;

a priority determining controller for determining the order of priorities of the first and second equipment, based on the characteristics of each of the equipment; and a transmission controller for transmitting the information about the first and second equipment to the centralized management apparatus, in accordance with the order of priorities determined by the priority determining controller, when the first judging device judges that it is the time of transmitting the information about the first equipment, and the second judging device judges that it is the time of transmitting the information about the second equipment.

In the equipment management apparatus, the first judging device judges whether or not it is the time for transmitting the information about the first equipment. Similarly, the second judging device judges whether or not it is the time for transmitting the information about the second equipment. In addition, the priority determining controller determines the order of priorities of the first and second equipment in accordance with the characteristics of each of the equipment. When the first judging device judges that it is the time for transmitting the information about the first equipment, and the second judging device judges that it is the time for transmitting the information about the second equipment, the transmission controller transmits the information about each of the equipment to the centralized management apparatus, in accordance with the order of priorities which has been determined by the priority determining controller. Specifically, when the timing for transmitting the information about the first equipment is overlapped with the timing for transmitting the information about the second equipment, the information is sequentially transmitted from each of the equipment in accordance with the order of priorities of each of equipment that has been determined by the priority determining controller.

Examples of the characteristic for each of equipment include the type of color, the system speed, and the number of optional devices mounted to the equipment. When the order of priorities is determined based on the characteristics exemplified above, the order of priorities can be determined in the following manner. That is, higher priority is assigned to color-type equipment than monochrome-type equipment, and higher priority is assigned to equipment with higher system speed than equipment with lower system speed. In addition, higher priority is assigned to equipment having larger number of optional devices than equipment having smaller number of optional devices. Based on thus-determined order of priorities, the information is transmitted from each of equipment. As a result, it is possible to assign higher priority to the information about the equipment for which maintenance is much needed, and to transmit such information to the centralized management apparatus prior to other information.

The priority determining controller can also determine the order of priorities of the equipment, based on the kinds of information that is transmitted from each of the equipment, for example, emergency transmission, closing date transmission, fixed time transmission, warning transmission, and the like. In this case, ranking of priorities, from highest to lowest, may be the emergency transmission, the closing date transmission, the fixed time transmission, and the warning transmission in this order. In this manner, information with more importance and information with higher urgency can be assigned with higher priority to be transmitted to the centralized management apparatus prior to other information.

As described above, by use of the equipment management apparatus of the present invention, higher priority can be assigned to information about the equipment for which maintenance is much needed, information with more importance, and information with higher urgency, and such information can be transmitted to the centralized management apparatus prior to other information. In this manner, it becomes possible to efficiently conduct maintenance for each equipment, and thereby reducing the number of times of dispatching service engineers.

In still another aspect of the present invention, an equipment management system includes an equipment management apparatus for transmitting management information collected from a plurality of equipment, and a centralized management apparatus for managing each of the plurality of equipment based on the management information transmitted from the equipment management apparatus, wherein the equipment management apparatus comprises:

a first judging device for judging whether or not it is the time of transmitting information about a first equipment;

a second judging device for judging whether or not it is the time of transmitting the information about a second equipment;

a priority determining controller for determining the order of priorities of the first and second equipment, based on a characteristic of each of the equipment; and a transmission controller for transmitting the information about the first and second equipment to the centralized management apparatus, in accordance with the order of priorities determined by the priority determining controller, when the first judging device judges that it is the time of transmitting the information about the first equipment, and the second judging device judges that it is the time of transmitting the information about the second equipment.

In still another aspect of the present invention, an equipment management method in which one equipment management apparatus collects management information about a plurality of equipment, and the equipment management apparatus transmits the management information to a centralized management apparatus so as to manage the plurality of equipment, includes steps of:

a step of judging whether or not it is the time of transmitting information about a first equipment from the equipment management apparatus;

a step of judging whether or not it is the time of transmitting the information about a second equipment from the equipment management apparatus; and a step of transmitting the information about the first and second equipment from the equipment management apparatus to the centralized management apparatus, in accordance with the order of priorities based on the characteristics of each of the equipment, when it is judged that it is the time of transmitting the information about the first equipment, and it is judged that it is the time of transmitting the information about the second equipment.

By use of the equipment management system or the equipment management method as well, as described above, when the timing for transmitting the information about the first equipment is overlapped with the timing for transmitting the information about the second equipment, the information is sequentially transmitted from each equipment, in accordance with the order of priorities based on the characteristics of each equipment. Then, in accordance with the characteristics of each of the equipment which are taken into consideration at the time of determining the order of priorities, it is possible to assign higher priority to the information about the equipment for which maintenance is much needed, and to transmit such information to the centralized management apparatus prior to other information. Similarly, higher priority can be assigned to information with more importance and information with higher urgency, and to transmit such information to the centralized management apparatus prior to other information.

BRIEF DESCRIPTION OF THE DRAWINGS

FIG. 3 is an explanatory diagram showing a structure of data inputted into the data terminal;

DETAILED DESCRIPTION OF THE PREFERRED EMBODIMENTS

Hereinafter, embodiments of the present invention will be described in detail with reference to drawings. In the embodiments of the present invention, the present invention is applied to the centralized management of an image forming apparatus. In the embodiments, a copying machine is exemplified as the image forming apparatus; however, the image forming apparatus may be other devices such as a printer and a facsimile machine. In addition, the device to be managed may be selected from other various devices, on top of the image forming apparatus, such as business machines including image scanners and personal computers, household electrical appliances with communication capability.

First Embodiment

Figure 1:
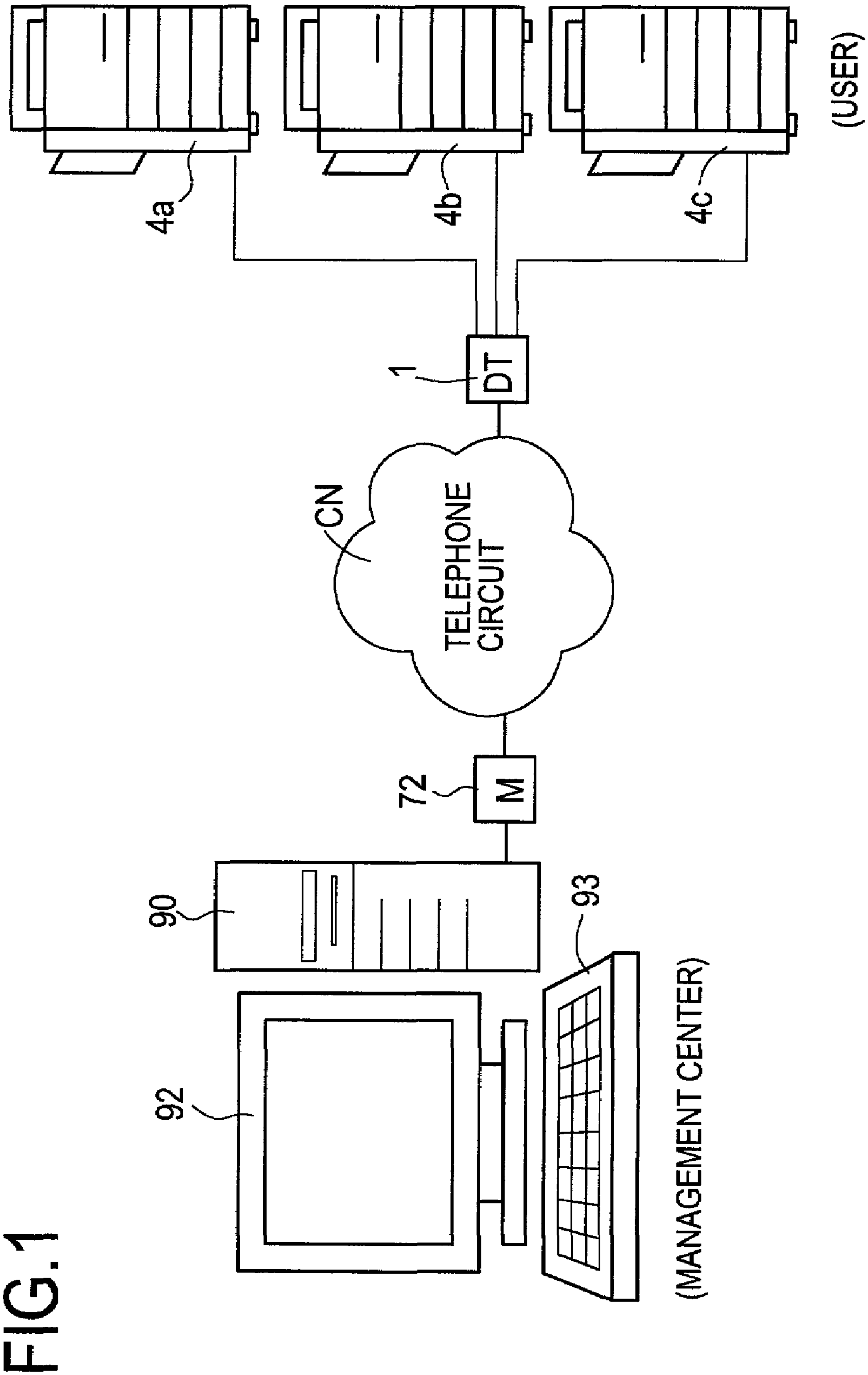
FIG. 1 is a schematic structural diagram showing a system for managing a copying machine according to a first embodiment.

First, a first embodiment will be described. As shown in FIG. 1, a system for managing a copying machine according to the first embodiment includes: copying machines 4*a*, 4*b*, 4*c* installed on user sides; a data terminal (i.e. an equipment management apparatus) 1; a modem 72 installed on a management center side; a computer 90; and a telephone circuit CN which connects a modem 52 incorporated within the data terminal 1 (see FIG. 2) and a modem 72 on the management center side with each other. In the computer 90, a central processing unit (CPU) is mounted, and a display 92 and a key board 93 are connected therewith. The computer 90, the display 92, the keyboard 93, and the modem 72 together constitute a centralized management apparatus of the management center. The centralized management apparatus may also include other devices such as a printer.

In the management center, based on the data sent from the data terminal 1, various diagnosis for the copying machines 4*a*, 4*b*, 4*c* are performed (such as recognizing the conditions of the copying machines, identifying the causes of malfunctions thereof, finding out a method for handling with the malfunctions, and the like). In accordance with the result of the diagnosis, the person who manages the copying machines performs appropriate treatments for each of the copying machines. In this embodiment, the management center is connected with one data terminal; however, the management center may be connected with a plurality of data terminals, as a matter of course. In addition, the number of copying machines which can be connected with one data terminal is not limited to three.

Figure 2:
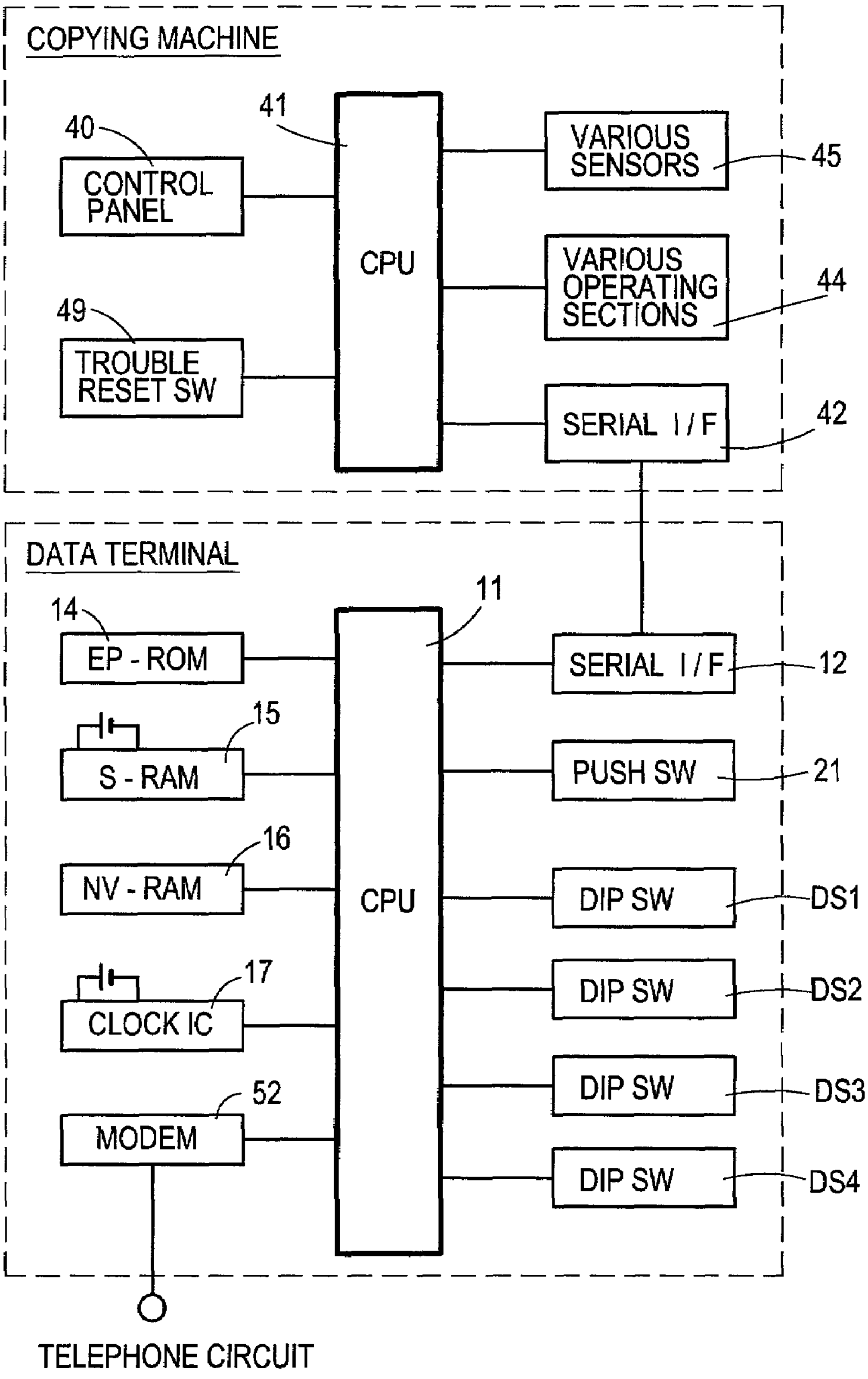
FIG. 2 is a block diagram showing a structure of the copying machine and the data terminal shown in FIG. 1.

The copying machines 4*a*, 4*b*, 4*c* respectively reproduce an image of an original document onto paper. As shown in FIG. 2, each of the copying machines 4*a*, 4*b*, 4*c* includes a CPU 41. To the CPU 41, a control panel 40, various sensors 45, various operating sections 44, a serial I/F 42, a trouble reset switch 49, and the like are connected. The CPU 41 counts counter values of the following counters: a counter used as a basis on which the amount of money to be charged for the copy is calculated by the computer 90 of the management center (i.e. a total counter for indicating the number of times paper has been ejected, and a paper size-by-size counter for indicating the number of sheets of paper which has been used on size-by-size basis); and a counter for determining whether or not a maintenance is needed (i.e. a JAM counter for indicating the number of times paper jamming has occurred, a trouble counter for indicating the number of times troubles have occurred, and a PM counter for counting the number of times each of the parts mounted to the copying machine has been used). Each of the counted values is transmitted to the CPU 11 of the data terminal 1 via the serial I/F 42 and the serial I/F 12.

In addition, various element data which have influences to the image forming process are detected by various sensors 45 provided at various locations within the copying machine (examples of the various element data include data of: time required for carrying paper; potential at a surface of a photosensitive drum; concentration of toner in developer; light amount of exposure to the photosensitive drum; bias potential at the time of development; amount of toner attached to the photosensitive drum; and grid potential of a charger, and the like). The detected values are taken into the CPU 41 and are processed, and then, the processed data are transmitted to the CPU 11 of the data terminal 1 via the serial I/F 42 and the serial I/F 12.

On the other hand, the data terminal 1 takes various information from the copying machines 4*a*, 4*b*, 4*c*, and conducts predetermined processing thereto. Then, the data terminal 1 transmits the processed various information to the computer 90 of the management center. As shown in FIG. 2, the CPU 11 is mounted to the data terminal 1. To the CPU 11, a serial I/F 12, an EPROM 14, a SRAM 15, a NVRAM 16, a clock IC 17, a modem 52, a push switch 21, dip switches DS1 to DS4 and the like are connected.

The data terminal 1 identifies each of the copying machines 4*a* to 4*c* by use of the port numbers of the serial I/F 12. It is also possible to connect the data terminal 1 with the copying machines 4*a* to 4*c* by other kind of I/F than the serial I/F.

In the EPROM 14, control programs for the data terminal 1 are stored. In the NVRAM 16, the telephone number of the management center and the like is stored. The SRAM 15 and the clock IC 17 have their respective battery backups.

The push switch 21 is a switch for giving command to perform initial transmission and the like. The dip switch DS1 is a switch for setting a mode of inputting the telephone number of the management center. The dip switch DS2 is a switch for setting a mode of inputting the ID number for identifying the data terminal 1. The dip switch DS3 is a switch for setting a mode of inputting the ID number for identifying the management center. The dip switch DS4 is a switch for setting the initial setting mode.

The CPU 11 can give instruction to the modem 52 for invoking the modem 72. Upon giving the instruction, the CPU 11 can communicate with the computer 90 via the telephone circuit CN.

FIG. 3 is a diagram showing data with 8 bits which is input from the copying machines to the data terminal 1 via the serial I/F 12. As shown in FIG. 3, bit b0 shows a paper ejecting code, bits b7, b6 respectively show a JAM occurring code which shows the occurrence of paper jamming, and a trouble occurring code which shows the occurrence of various troubles. Specifically, paper ejection is shown by the falling edge of bit b0 (i.e. the change from 1 to 0). The JAM occurring code is shown by bit b7=1 and also bit b6=0. In addition, the trouble occurring code is shown by bit b7=1 and also bit b6=1. The 8-bit data is also input into the data terminal 1 when the paper jamming or troubles occur in each of the copying machines.

In addition, the management data is periodically input from each of the copying machines 4*a* to 4*c* into the data terminal 1. The management data include the various counter values and the detected various element data which have been described above.

Figure 4:
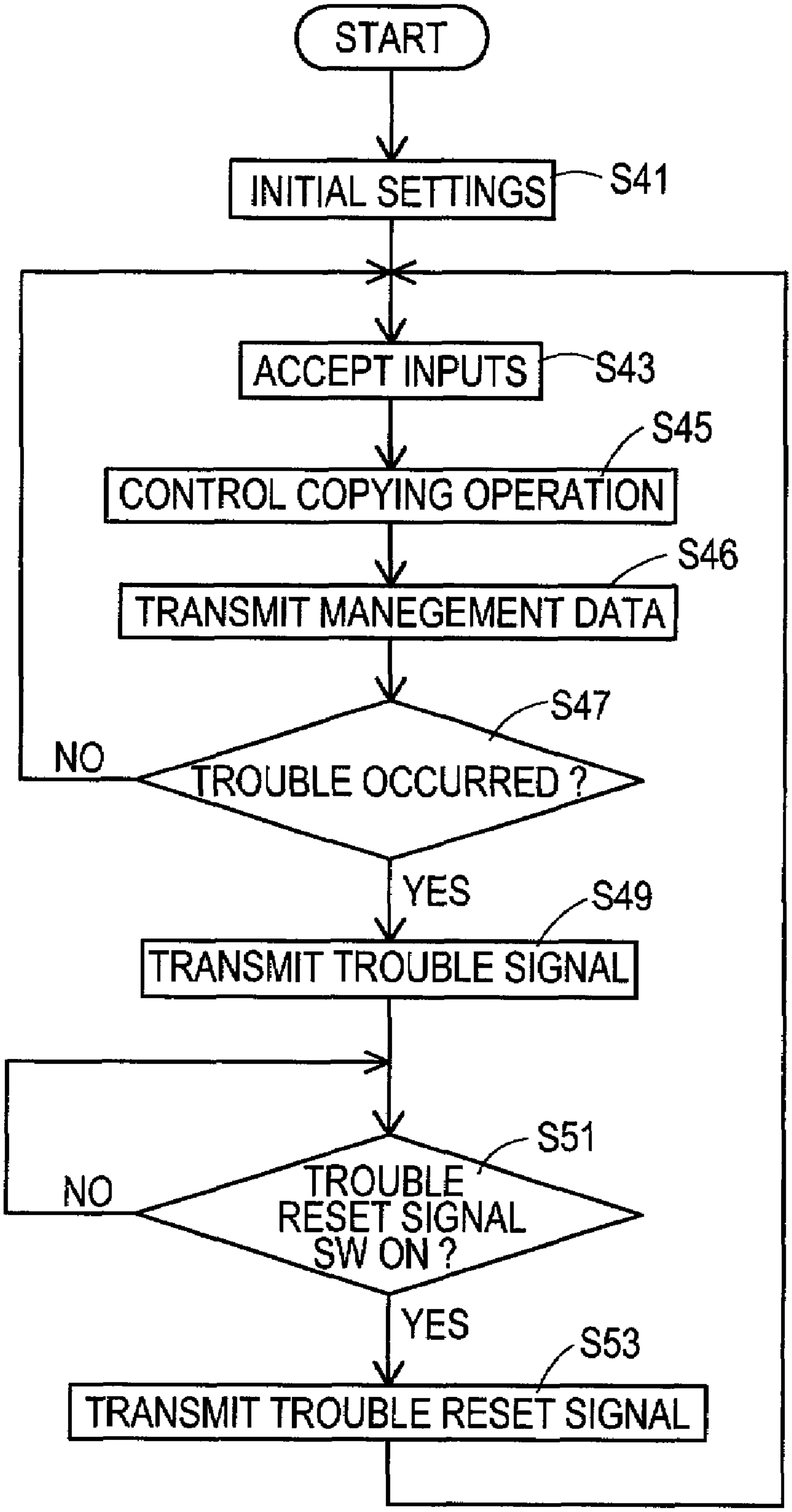
FIG. 4 is a flow chart illustrating an operation of a central processing unit (CPU) in the copying machine.

Hereinafter, the operation of the copying machine management system having the structure described above will be described. First, the operation of the CPU 41 of the copying machine 4*a* will be described with reference to the flowchart of FIG. 4. The operations of the copying machines 4*b* and 4*c* are the same as that of the copying machine 4*a*, and therefore, their descriptions will be omitted. When the power of the copying machine 4*a* is turned on, initial settings such as clearing the memory and setting of the standard mode are performed (S41). Next, an input from the control panel 40 and inputs from the various sensors 45 are accepted (S43). Then, copying operation is controlled, that is, various operating sections 44 are controlled. Specifically, paper feeding control, photosensitive drum control, and developing device control and the like are performed. As a result of these controls, the image of the original document is copied on paper (S45).

After that, the management data is transmitted to the data terminal 1 (S46). The management data includes the counter values of various counters and various element data which have been described above. Usually, the management data is automatically transmitted at a specified period. In addition, as will be described later, the management data is also transmitted to the data terminal 1 when required by the data terminal 1.

Subsequently, it is judged whether or not a trouble has occurred (S47). When no trouble has occurred (S47: No), the processing returns to S43. Contrarily, when any trouble has occurred (S47: Yes), a signal corresponding to a trouble which has occurred is transmitted to the CPU 11 of the data terminal 1 (S49). The trouble signal transmitted at this time is a signal having the data format shown in FIG. 3 described above. Furthermore, it is judged whether or not an operator has turned on the trouble reset switch 49 (S51). When the trouble reset switch 49 is turned on (S51: Yes), a trouble reset signal is transmitted to the CPU 11 of the data terminal 1 (S53), and the processing returns to S43.

Figure 5:
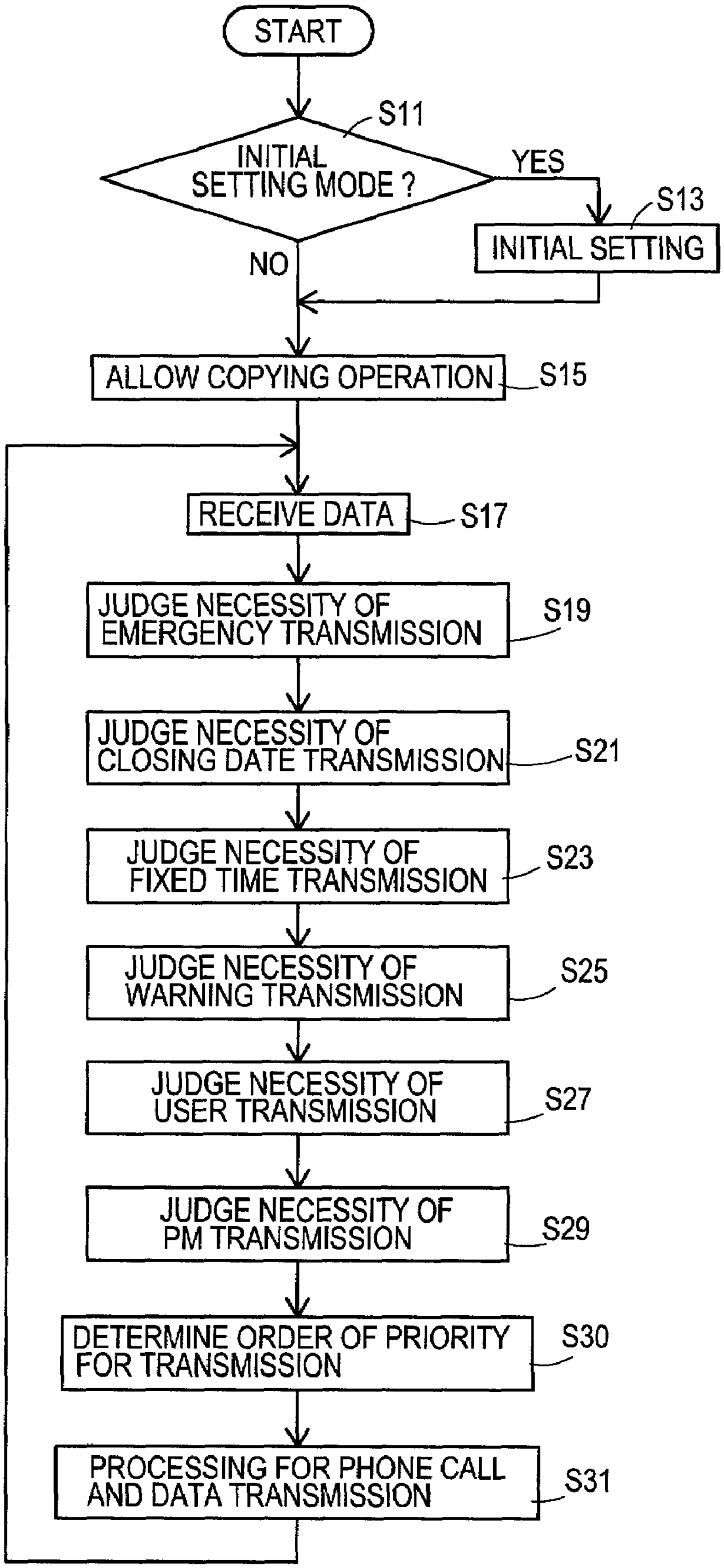
FIG. 5 is a flow chart illustrating an operation of the data terminal.

Next, the control processing in the CPU 11 mounted to the data terminal 1 will be described with reference to the flow chart of FIG. 5. When the power of the data terminal 1 is turned on, it is judged whether or not the initial setting mode is set (S11). When the initial setting mode is set, specifically, when the dip switch DS4 is in an on state (S11: Yes), the processing for setting the initial setting is conducted (S13), and after that, a signal for allowing the copying operation is transmitted to the CPU 41 of each of the copying machines (S15). In the processing for initial setting at this time, the following processing are conducted: the telephone number and the ID number of the management center are set; the copying machines 4*a*, 4*b*, 4*d* are associated with the serial port numbers; and the initial setting is transmitted; and the like. On the other hand, when no initial setting mode is set (S11: No), a signal for allowing the copying operation is immediately transmitted to the CPU 41 of each of the copying machines (S15).

When the copying operation allowing signal is transmitted, the following processing are performed in the following order: processing for receiving data (S17); processing for judging necessity of emergency transmission (S19); processing for judging necessity of closing date transmission (S21); processing for judging necessity of fixed time transmission (S23); processing for judging necessity of warning transmission (S25); processing for judging necessity of user transmission (S27); processing for necessity of judging PM transmission (S29); processing for determining order of priorities for transmission (S30); and processing for phone call and data transmission (S31).

Specifically, the processing for receiving data is processing for receiving management data about the conditions of each copying machine periodically transmitted from each copying machine. The detail of the management data is as follows: a paper ejecting code; a JAM trouble code; a JAM trouble counter value; a paper size-by-size counter value; a PM counter value; and various element data, and the like. These latest data are stored in the SRAM 15 of the data terminal 1. The latest data stored in the SRAM 15 are transmitted to the computer 90 of the management center periodically or when necessary. In addition, in the processing for receiving data, a trouble signal transmitted from each copying machine when any trouble has occurred therein is received.

The processing for judging necessity of the emergency transmission is to judge whether or not trouble data and trouble recovery data from each copying machine should be transmitted to the management center. Among this processing, the judgment of the trouble data transmission will be described later. The processing for judging the closing date transmission is to judge whether or not the management data such as a total counter value used as a basis for calculating the amount of money to be charged for the copying, a paper size-by-size counter value and the like should be transmitted to the management center when the time of transmitting a specified closing date comes. In the SRAM 15, the data, transmitted from the management center, about the date on which the closing date of each copying machine should be transmitted is stored. When the closing date of any one or more of the copying machines comes, the closing date transmission flag corresponding to the copying machine is turned on. Defining the closing date transmission flags corresponding to the copying machines as Da flag, Db flag, and Dc flag respectively, when the closing date for the copying machine 4*a* comes for example, Da flag is turned on. When any one or more of the closing date transmission flag is turned on, the transmission flag is identified in the processing for phone call and data transmission in S31. As a result, the management data for the corresponding copying machine is transmitted to the management center. When the transmission of the data is completed, the data about the date on which the next closing date should be transmitted is returned from the management center.

The processing for judging necessity of the fixed time transmission is to judge whether or not the various management data about the conditions of each copying machine should be transmitted to the management center at a specified time. In the SRAM 15, the data, transmitted from the management center, about the fixed time on which the conditions of each copying machine should be transmitted is stored. When the fixed time of data transmission for any one or more of the copying machines comes, the fixed time transmission flag corresponding to the copying machine is turned on. Defining the fixed time transmission flags corresponding to the copying machines as Ha flag, Hb flag, and Hc flag respectively, when the fixed time of data transmission for the copying machine 4*a* comes for example, Ha flag is turned on. When any one or more of the fixed time transmission flag is turned on, the transmission flag is identified in the processing for phone call and data transmission in S31. As a result, the management data about the corresponding copying machine is transmitted to the management center. When the transmission of the data is completed, the data about the current time, and the data about the time on which the next fixed time transmission should be made are returned from the management center.

The processing for judging necessity of the warning transmission is to compare the element data, the counter value of the JAM counter and the counter value of the PM counter with their respective specified threshold values, and to judge, based on the results of the comparison, whether or not the warning data and the warning cancellation data should be transmitted to the management center. In the SRAM 15, threshold values of each of the copying machines are stored. When the counter value or element data about any one or more of the copying machines exceeds their respective specified threshold values, the warning transmission flag corresponding to the copying machine is turned on. Defining the warning transmission flags corresponding to the copying machines as Ka flag, Kb flag, and Kc flag respectively, when the counter value or the element data about the copying machine 4*a* exceeds their respective threshold value for example, Ka flag is turned on. When any one or more of the warning transmission flag is turned on, the transmission flag is identified in the processing for phone call and data transmission in S31. As a result, the management data of corresponding copying machine such as the warning information, the element data, the counter value of the JAM counter, the counter value of the PM counter, and the like are transmitted to the management center.

The processing of judging necessity of the user transmission is to judge whether or not various data about the conditions of the copying machine should be transmitted to the management center when the push switch 21 is depressed by the user. The processing of PM transmission is to judge whether or not the counter value of the PM counter before the counter is cleared to zero as a result of replacement of the parts should be transmitted to the management center.

As has been described above, in the processing to judge whether or not various signals should be transmitted, when it is judged that the signal should be transmitted, each of the various transmission flag is turned on. If any one or more of the transmission flags is in an on-state, the processing of phone call and data transmission is conducted where the data corresponding to the transmission flag is transmitted from the data terminal 1 to the computer 90 of the management center. The processing of determining an order of priorities of data to be transmitted is to determine the order of priorities of transmitting data from each of the copying machines, when the copying machines make data transmission simultaneously, that is, the transmission flags of the plurality of copying machines are turned on simultaneously. The detail of this processing will be described later.

As described above, the copying machines 4*a* to 4*c* which are under control of the data terminal 1 are intensively managed by the centralized management apparatus of the management center via the telephone circuit CN. Specifically, the computer 90 of the management center manages the date and time when the trouble occurred, the detail of the trouble, the state of warning, the user information, the amount of money to be charged for the copying, and the like. In some cases, measures such as dispatch of a service engineer is taken.

Figure 6:
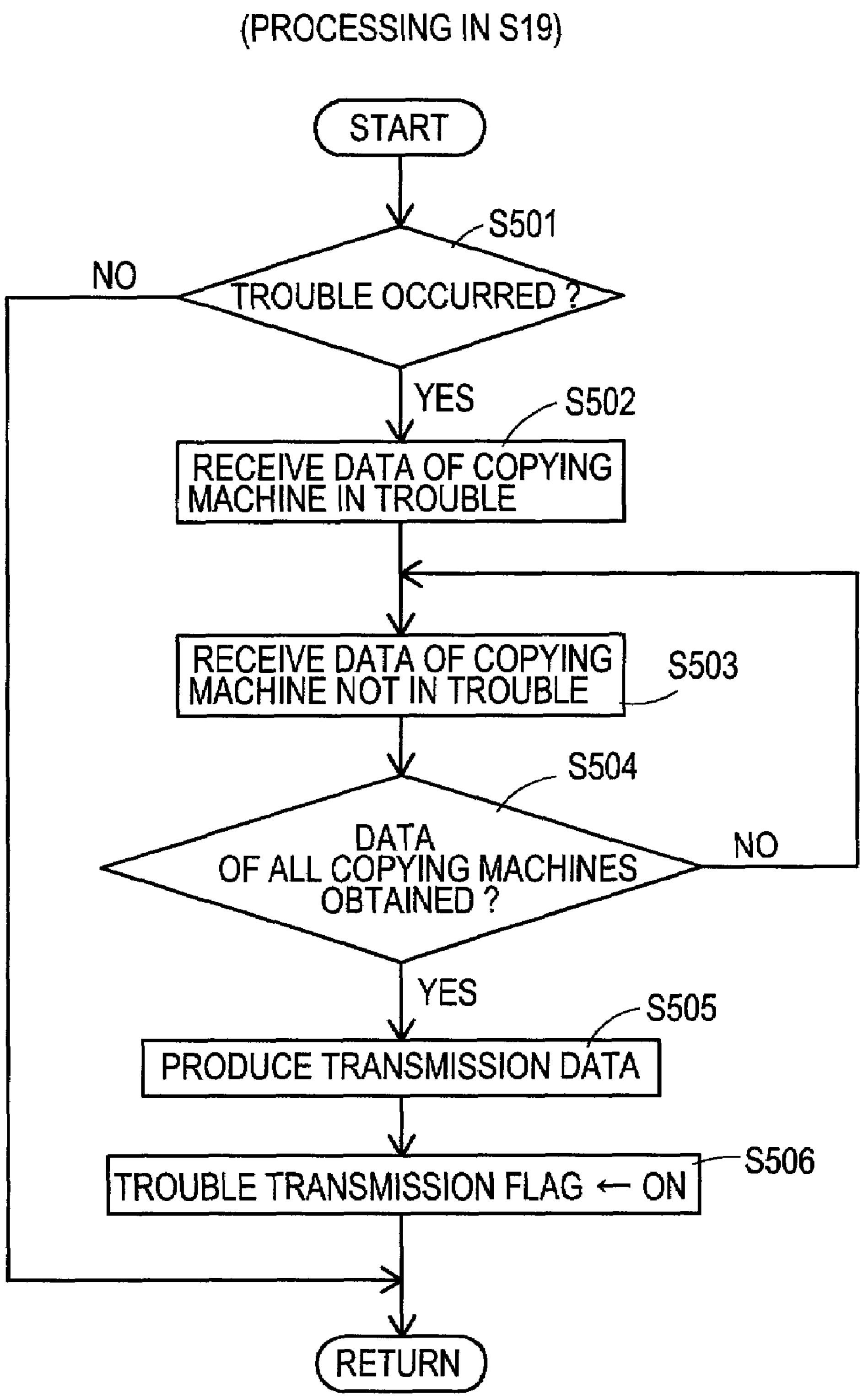
FIG. 6 is a flow chart illustrating the processing for judging necessity of the emergency transmission in S19 of FIG. 5.

Next, the processing of judging the emergency transmission in S19 will be described in detail with reference to FIG. 6. In this processing, it is judged whether or not transmission should be made and the data to be transmitted is made in the case where a trouble has occurred in any one or more of the copying machines which are under control of the data terminal 1. Specifically, the case where a trouble has occurred means that the on-edge of the trouble code b6 of a trouble signal (having a data format shown in FIG. 3) transmitted from any one or more of the copying machines 4*a* to 4*c* is detected.

First, in the data terminal 1, it is confirmed whether or not a trouble has occurred in any one or more of the copying machines 4*a* to 4*c*, based on the signal from each of the copying machines 4*a* to 4*c* (S501). If a trouble has occurred in any one or more of the copying machines 4*a* to 4*c*, that is, the trouble code b6 is in an on-state (S501: Yes), the trouble data and other management data about the copying machine in which the trouble has occurred are obtained in the data terminal 1 (S502). The trouble data includes codes each showing the kind of the trouble and the position where the trouble has occurred. The other management data includes various counter values such as the total counter, the size-by-size counter, the JAM counter, and the trouble counter, the information about the ROM version of the copying machine, the choice and adjust data, various element data, and the like.

Next, the management data about all the other copying machines in which no trouble has occurred are obtained in the data terminal 1 (S503). In this step, a signal for requiring the copying machines in which no trouble has occurred to transmit their management data is transmitted. In response to the signal transmission, the management data are collected from the copying machines. Each of the management data collected from each of the copying machines includes various counter values such as the total counter, the size-by-size counter, the JAM counter, and the trouble counter, the information about the ROM version of the copying machine, the choice and adjust data, various element data, and the like. Subsequently, it is judged whether or not the management data about all the copying machines in which no trouble has occurred are obtained (S504). If all the management data about all the copying machines in which no trouble has occurred are not still obtained by the data terminal 1 (S504: No), the processing returns to S503 where the management data is sequentially obtained from the copying machine from which its management data is not still obtained.

At the completion of obtaining the management data about all the copying machines in which no trouble has occurred by the data terminal 1 (S504: Yes), transmission data to be transmitted to the computer 90 of the management center is produced (S505). Specifically, the transmission data is produced in such a manner that it includes the trouble data and the management data about the copying machine in which the trouble has occurred, as well as the management data about the copying machines in which no trouble has occurred.

Then, the trouble transmission flag corresponding to the copying machine in which the trouble has occurred is turned on (S506). Defining the trouble transmission flags corresponding to the copying machines as Ta flag, Tb flag, and Tc flag respectively, when a trouble has occurred in the copying machine 4*a* for example, Ta flag is turned on. When any one or more of the trouble transmission flag is turned on, the transmission flag is identified in the processing for phone call and data transmission in S31. As a result, the transmission data produced in S505 is transmitted to the computer 90 of the management center.

As a result of the processing described above, the management center can recognize the conditions of the copying machines in which no abnormality has been detected, as well as the trouble which has occurred in any one or more of the copying machines 4*a* to 4*c*. Specifically, it becomes possible to know which copying machine will need maintenance in a near future. Therefore, when a service engineer is dispatched to deal with the trouble of one of the copying machines, the service engineer can take preventive maintenance for the copying machine which will need maintenance in a near future. This arrangement eliminates the necessity of dispatching service engineers many times, thereby reducing the number of times that service engineers are dispatched.

On the assumption that a trouble has occurred in the copying machine 4*a*, it is judged as "Yes" in S501, and the trouble data and other management data about the copying machine 4*a* are obtained by the data terminal 1. Then, the management data about the copying machine 4*b* is obtained by the data terminal 1. After that, it is judged as "No" in the processing in S504. This is because the management data about the copying machine 4*c* is not still obtained. Therefore, the process returns to the procedure of S503 where the management data for the copying machine 4*c* is obtained by the data terminal 1. In this processing, the management data about the copying machines 4*b*, 4*c* in which no trouble has occurred are obtained, among the copying machines which are under control of the data terminal 1. As a result, in the processing in S504, it is judged as "Yes". Then, in the processing in S505, transmission data including the trouble data and the other management data for the copying machine 4*a*, the management data for the copying machines 4*b*, 4*c*, which are obtained by the data terminal 1, is produced. The produced transmission data is then transmitted to the computer 90 of the management center in the processing for phone call and data transmission in S31. In this embodiment, the description is made as to the case where, in response to the occurrence of the trouble in one copying machine, the management data about the other copying machines are collected, so as to produce the transmission data. Alternatively, it is also possible to produce the transmission data by use of the management data which have been periodically transmitted from the copying machines beforehand and are stored in the SRAM 15.

Figure 7:
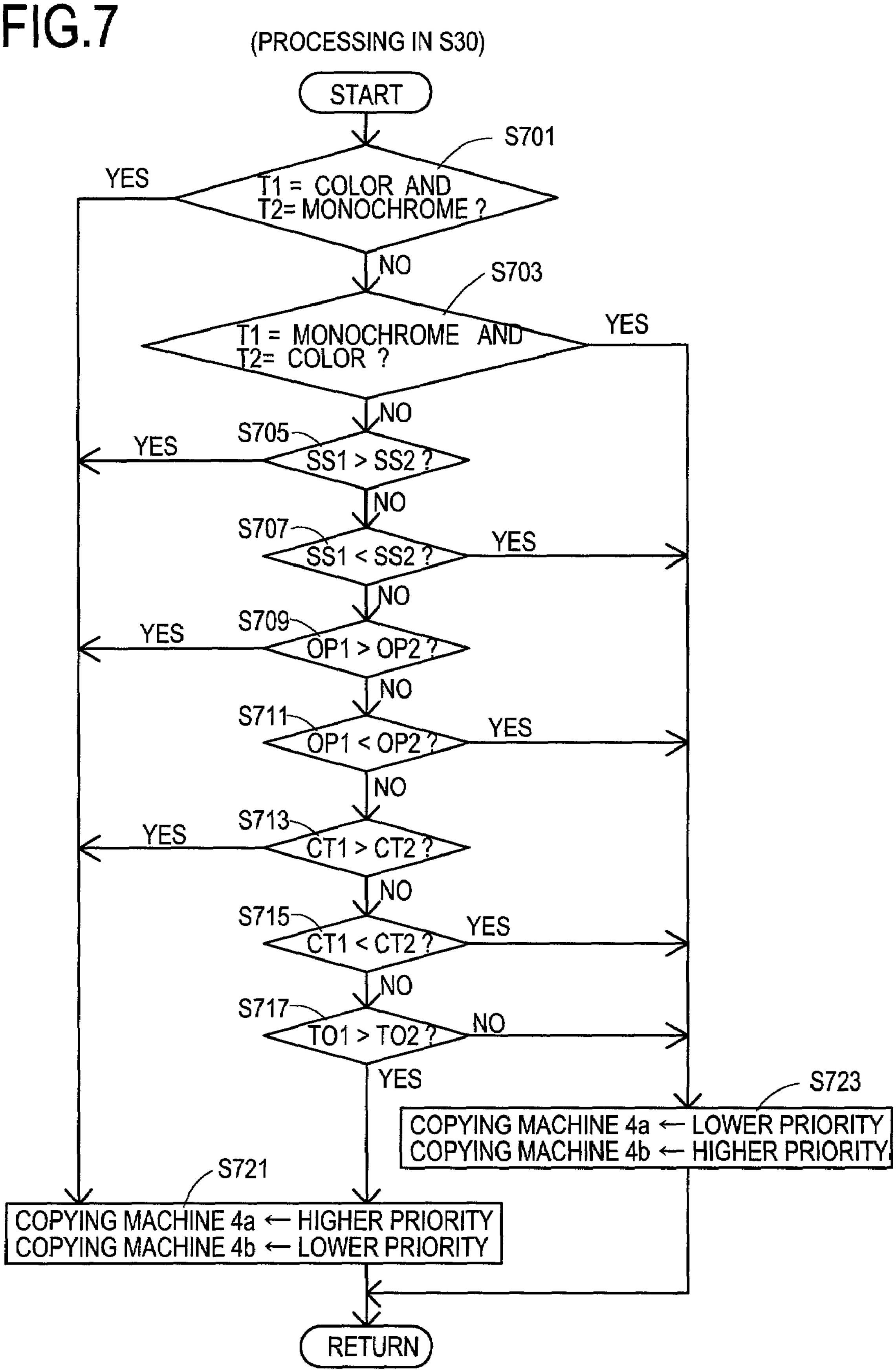
FIG. 7 is a flow chart illustrating the processing for determining the transmission priority order in S30 of FIG. 5.

Hereinafter, the processing of determining the order of priorities of data in S30 to be transmitted will be described with reference to the flow chart of FIG. 7. This is processing for determining the order of priorities of the data to be transmitted in the case where the timings of transmitting the management data and the trouble data about the copying machines 4*a* to 4*c* to the centralized management apparatus, are overlapped with each other. The data is transmitted in accordance with the order of priorities which has been determined in the following steps. This process is also one of the characteristics of the management system of the present invention. The description will be made on the assumption that the timing of transmitting the data for the copying machine 4*a* to the computer 90 and the timing of transmitting the data for the copying machine 4*b* to the computer 90 are overlapped with each other.

Specifically, the expression that "the timings of transmitting the data about the copying machines are overlapped with each other" means that the various transmission flags which have been described above are simultaneously in an on-state with respect to the plurality of copying machines. An example of such a state is as follows:

(1) Troubles have occurred in the copying machines 4*a* and 4*b* almost at the same time. Specifically, both Ta flag and Tb flag, which are trouble transmission flags, are in an on-state.

(2) A trouble has occurred in the copying machine 4*a* at the time of transmitting the data about the fixed time of the copying machine 4*b*. Specifically, Ta flag, which is a trouble transmission flag for the copying machine 4*a* is an on-state, and also, Hb flag, which is a fixed time transmission flag for the copying machine 4*b*, is an on-state; and (3) The transmission of the data about the fixed time for the copying machine 4*a* and the transmission of the data about the fixed time for the copying machine 4*b* are conducted at the same time. Specifically, both Ha flag and Hb flag, which are fixed time transmission flags, are in an on-state. This state is created by an error in the time on the clocks of the copying machines or the like.

Each of the above examples shows the case where the timings of transmitting the data from the plurality of copying machines are overlapped with each other. However, the present invention is not limited thereto, and the present invention is also applicable to cases where the various transmission flags for the plurality of copying machines are turned on simultaneously.

First, the CPU 11 of the data terminal 1 determines the order of priorities, based on the types of the copying machines 4*a,* 4*b* (i.e. whether they are color copying machine or monochrome copying machine) (S701, and S703). When the type T1 of the copying machine 4*a* is a color type, and the type T2 of the copying machine 4*b* is a monochrome type (S701: Yes), higher priority is assigned to the copying machine 4*a,* and lower priority is assigned to the copying machine 4*b* (S721). Contrarily, when the type T1 of the copying machine 4*a* is a monochrome type, and the type T2 of the copying machine 4*b* is a color type (S703: Yes), higher priority is assigned to the copying machine 4*b,* and lower priority is assigned to the copying machine 4*a* (S723).

When the types T1, T2 of the copying machines 4*a*, 4*b* are the same with each other (S701: No, S703: No), the order of priorities is determined in accordance with the speed of the system that each of the copying machines 4*a*, 4*b* has (S705, S707). When the system speed SS1 of the copying machine 4*a* is higher than the system speed SS2 of the copying machine 4*b* (S705: Yes), higher priority is assigned to the copying machine 4*a,* and lower priority is assigned to the copying machine 4*b* (S721). Contrarily, when the system speed SS1 of the copying machine 4*a* is lower than the system speed SS2 of the copying machine 4*b* (S707: Yes), higher priority is assigned to the copying machine 4*b,* and lower priority is assigned to the copying machine 4*a* (S723).

When the system speeds SS1, SS2 of the copying machines 4*a,* 4*b* are also the same with each other (S705: No, S707: No), the order of priorities is determined based on the number of the optional devices that each of the copying machines 4*a,* 4*b* has (S705, S707). When the number OP1 of the optional devices mounted to the copying machine 4*a* is larger than the number OP2 of the optional devices mounted to the copying machine 4*b* (S709: Yes), higher priority is assigned to the copying machine 4*a,* and lower priority is assigned to the copying machine 4*b* (S721). Contrarily, when the number OP1 of the optional devices mounted to the copying machine 4*a* is smaller than the number OP2 of the optional devices mounted to the copying machine 4*b* (S711: Yes), higher priority is assigned to the copying machine 4*b,* and lower priority is assigned to the copying machine 4*a* (S723). In the manner as described above, the order of priorities is determined in accordance with the characteristics of each of the copying machines.

When the numbers OP1, OP2 of the optional devices of the copying machines 4*a,* 4*b* are also the same with each other (S709: No, S711: No), the order of priorities is determined based on the kinds of transmission data (S713, S715). The order of priorities which is based on the kinds of transmission data has been predetermined beforehand. In this embodiment, the order of priorities from high to low is as follows: emergency transmission, closing date transmission, fixed time transmission, warning transmission, user transmission, and PM transmission. When the order of priority CT1 of the transmission data about the copying machine 4*a* is higher than the order of priority CT2 of the transmission data about the copying machine 4*b* (S713: Yes), higher priority is assigned to the copying machine 4*a,* and lower priority is assigned to the copying machine 4*b* (S721). Contrarily, when the order of priority CT1 of the transmission data about the copying machine 4*a* is lower than the order of priority CT2 of the transmission data about the copying machine 4*b* (S715: Yes), higher priority is assigned to the copying machine 4*b,* and lower priority is assigned to the copying machine 4*a* (S723).

When there are two or more addresses to which the data should be transmitted, the following processing is further conducted. That is, when the order of priorities CT1, CT2 of the transmission data about the copying machines 4*a,* 4*b* are also the same with each other (S713: No, S715: No), the order of priority is determined based on the order of priorities of the addresses to which the data should be transmitted (S717). The order of priorities of the addresses has been predetermined beforehand. If there are two addresses including a maintenance center in charge of maintenance, and a billing center in charge of accounting, the maintenance center has higher priority than the billing center. If there is only one address to which the data should be transmitted, the processing described above is not conducted, and the process immediately proceeds to the processing in S721.

When the order of priority TO1 of the address to which data should be transmitted from the copying machine 4*a* is higher than the order of priority TO2 of the address to which data should be transmitted from the copying machine 4*b* (S717: Yes), higher priority is assigned to the copying machine 4*a,* and lower priority is assigned to the copying machine 4*b* (S721). Contrarily, when the order of priority TO1 of the address to which data should be transmitted from the copying machine 4*a* is lower than the order of priority TO2 of the address to which data should be transmitted from the copying machine 4*b* (S717: No), higher priority is assigned to the copying machine 4*b,* and lower priority is assigned to the copying machine 4*a* (S723).

After the determination of the order of priorities as described above, the CPU 11 of the data terminal 1 performs the processing for phone call. Consequently, when the timings of transmitting the data about the copying machines 4*a,* 4*b* from the data terminal 1 to the computer 90 are overlapped with each other, the CPU11 of the data terminal 1 identifies information with more importance and a signal with higher urgency, and transmits such information and signal to the computer 90 of the management center prior to other information and signals. Therefore, the system of the present invention has high reliability.

Alternatively, in the embodiment of the present invention, it is also possible to determine the order of priorities in the following manner. First, the order of priorities is determined in accordance with the characteristics of each of the copying machines. If the order of priorities cannot be determined in this manner, the order of priorities is determined in accordance with the degree of urgency of the transmission signal, that is, the conditions under which the signal is transmitted. If the order of priorities still cannot be determined in this manner, the order of priorities is determined in accordance with the characteristics of each of the copying machines.

Figure 8:
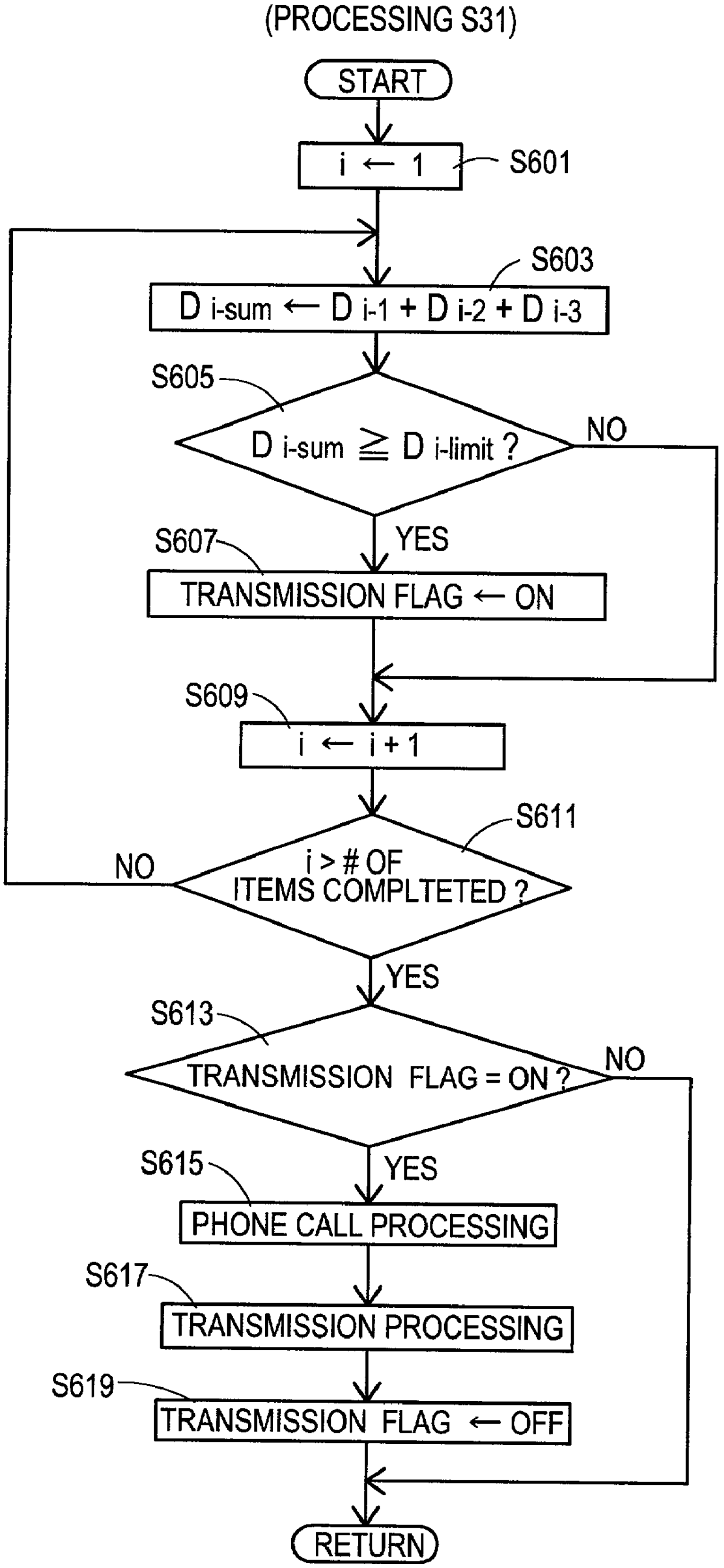
FIG. 8 is a flow chart illustrating the processing for phone call and data transmission in S31 of FIG. 5.

Hereinafter, the processing for phone call and data transmission in S31 will be described with reference to the flow chart of FIG. 8. In this processing, it is judged whether or not the various transmission flags which have been described above are in an on-state. If any one or more of the transmission flags is an on-state, the processing for phone call is conducted, and the data corresponding to the transmission flag is transmitted to the computer 90 of the management center. In addition, based on the total value of the data collected from the copying machines 4*a* to 4*c* which are under control of the data terminal 1, the data terminal 1 transmits the management data to the computer 90 of the management center.

First, the CPU 11 sets the item number i, which indicates the kind of data, to the initial value "1" (S601). Here, the data $D_i$ includes the total paper amount counter value, the paper size-by-size counter value, the paper kind-by-kind counter value, and the like. Next, the total value $D_{i-sum}$ of the data $Di_{i-1}$ collected from the copying machine 4*a*, the data $D_{i-2}$ collected from the copying machine 4*b*, and the data $D_{i-3}$ collected from the copying machine 4*c* is calculated (S603).

The calculation of the total value $D_{i-sum}$ is conducted every time when the data is updated in each of the copying machines 4*a* to 4*c*. Specifically, when the data transmitted from each of the copying machines 4*a* to 4*c* is updated, the updated data is stored in the SRAM 15 of the data terminal 1. Then, the total value $D_{i-sum}$ is calculated every time when the stored data is updated.

After the total value $D_{i-sum}$ is obtained in the above-described manner, the total value $D_{i-sum}$ is compared with the threshold value $D_{i-limit}$ (S605). If the total value $D_{i-sum}$ the same or larger than the threshold value $D_{i-limit}$ (S605: Yes), the total value transmission flag is turned on (S607), and the item number i is counted up S(609). Contrarily, if the total value $Di_{i-sum}$ is smaller than the threshold value $D_{i-limit}$ (S605: No), the item number i is immediately counted up (S609).

After that, it is judged whether or not all the processing for data about all the items have been completed (S611). If all the processing for data about all the items are not still completed (S611: No), the processing returns to S603. Contrarily, if all the processing are completed (S611: Yes), it is judged whether or not the transmission flag is an on-state (S613).

In the processing of judging the transmission flag in S613, it is judged whether or not the total value transmission flag is an on-state, and also it is judged whether or not various transmission flags which have been turned on in the processing of judging various transmissions in S19 through S29 are an on-state. Specifically, it is judged whether or not the various transmission flags listed below are in an on-state: the trouble transmission flags (Ta flag, Tb flag, and Tc flag); the closing date transmission flag (Da flag, Db flag, and Dc flag); the fixed time transmission flag (Ha flag, Hb flag, and Hc flag); and the warning transmission flag (Ka flag, Kb flag, and Kc flag).

When any one or more of the transmission flags is an on-state (S613: Yes), the processing for phone call is conducted (S615), and the data corresponding to the transmission flag in an on-state is transmitted to the computer 90 of the management center (S617). In this case, if the transmission flag for the total value is in an on-state, it is reported to the computer 90 that the total value $D_{i-sum}$ of the data about the copying machines 4*a* to 4*c* is larger than the threshold value $D_{i-limit}$. At this time, the management data about each of the copying machines are also transmitted to the computer 90. If any one or more of the trouble transmission flag is in an on-state, the transmission data which has been produced in the processing of judging the trouble transmission shown in FIG. 6 is transmitted to the computer 90.

After that, the transmission flag which has been judged as in an on-state is turned off (S619). The computer 90 of the management center performs data processing for the data which has been transmitted thereto, and allows various maintenance information to be displayed on the display 92. A person who manages the copying machines sees the displayed information, and takes cares for the copying machines such as maintenance thereof and replenishment of expendables thereto.

When the transmission flags of the plurality of copying machines are in an on-state in S613, in the transmission processing in S617, the data transmission is sequentially conducted in such a manner that the data about the copying machine assigned with higher priority is transmitted prior to other data, in accordance with the order of priorities which has been determined in the processing of determining the order of priorities in S30. Contrarily, when it is judged in S613 that no transmission flag is in an on-state (S613: No), the processing for phone call is not conducted, and the process returns to the main routine.

The data terminal 1 reports to the computer 90 of the management center that the total value $D_{i-sum}$ of the data collected from the copying machines 4*a* to 4*c* in the above-described processing is larger than the threshold value $D_{i-limit}$. By receiving such a report, the computer 90 can keep managing data for each of the data terminals. This structure makes it easy for the management center to manage the copying machines 4*a* to 4*c*, and reduces the number of communications between the data terminal 1 and the computer 90, thereby lowering the communication fee.

Hereinafter, description will be further made as to the transmission in the transmission processing in S617 in the case where a trouble has occurred. First, description will be made as to the case where the SRAM 15 has a sufficient capacity. In the transmission processing in S617, when a trouble has occurred in any one or more copying machines, the trouble data about the copying machine is transmitted together with the management data about all the other copying machines. In this case, the management data about the other copying machine is sequentially transmitted to the computer 90 of the management center in accordance with the order of priorities which has been determined in S30.

Next, description will be made as to the case where the SRAM 15 has a small capacity. When the SRAM 15 has a small capacity, there may be a case where the SRAM 15 cannot store all the data about the copying machines 4*a*, 4*b*, 4*c*. In such a case, the data terminal 1 cannot transmit all the data to the computer 90. If the copying machine of which data cannot be transmitted to the computer 90 is scheduled to have regular maintenance in a near future, the time to make the regular maintenance comes immediately after a service engineer is dispatched for dealing with the trouble in the copying machine. As a result, the service engineer has to be dispatched again for the maintenance of the copying machine.

In order to avoid such a situation, the following procedure is taken, if the SRAM 15 of the data terminal 1 is not capable of storing all the data about the copying machines 4*a*, 4*b*, 4*c*. That is, the data about the copying machine which is to be transmitted is determined, based on the count number remaining until the time for the next regular maintenance comes. In this embodiment, description will be made by exemplifying the case where the SRAM 15 has a capacity for storing data about only two copying machines.

Figure 9:
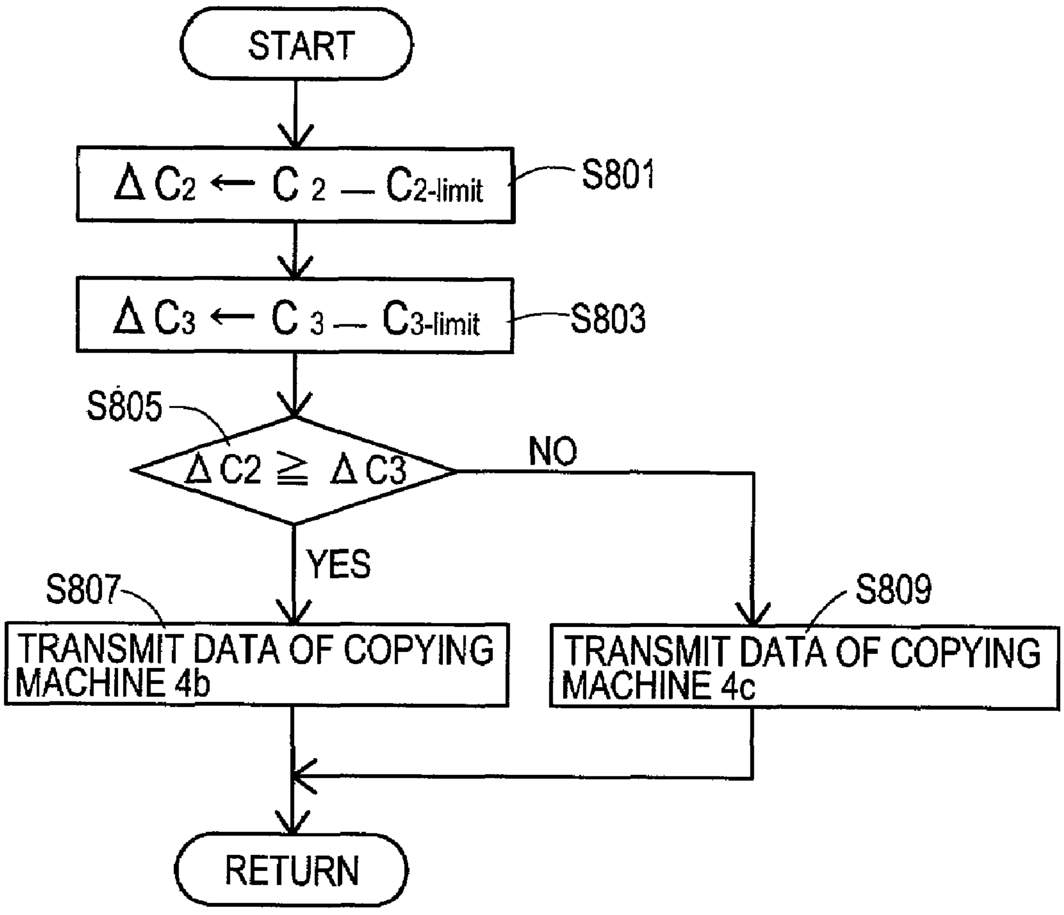
FIG. 9 is a flow chart illustrating the processing for data transmission in S617 of FIG. 8.

The transmission processing conducted in this case will be described with reference to the flow chart of FIG. 9. In this processing, the difference between the maintenance counter and the threshold value which has been set with respect to the maintenance counter is used as the count number remaining until the time for the next regular maintenance comes. The maintenance counter is a counter which conducts counting up together with the counting up of the total counter of the copying machine, and can be reset after maintenance is conducted by the service engineer. The threshold value for the maintenance counter has been predetermined beforehand.

The determination of the threshold value can be made by use of the key board 93 installed in the management center, or alternatively, by use of the management panel 40 of each of the copying machines.

First, the CPU 11 of the data terminal 1 calculates the difference $\Delta C_2$ between the maintenance counter $C_2$ of the copying machine 4*b* and the threshold value $C_{2\text{-}limit}$ for the maintenance counter $C_2$ is calculated (S801). Subsequently, the difference $\Delta C_3$ between the maintenance counter $C_3$ of the copying machine 4*c* and the threshold value $C_{3\text{-}limit}$ for the maintenance counter $C_3$ is calculated (S803). Then, it is judged whether or not the difference $\Delta C_2$ is larger than the difference $\Delta C_3$ (S805). When the difference $\Delta C_2$ is larger than the difference $\Delta C_3$, or when the difference $\Delta C_2$ is the same as the difference $\Delta C_3$ (S805: Yes), the data about the copying machine 4*b* is transmitted to the computer 90 of the management center together with the trouble data about the copying machine 4*a* (S807). Contrarily, when the difference $\Delta C_2$ is smaller than the difference $\Delta C_3$ (S805: No), the data about the copying machine 4*c* is transmitted to the computer 90 together with the trouble data about the copying machine 4*a* (S809).

In the processing described above, based on the count number remaining until the time for the next regular maintenance comes, the data about the copying machine which is to be transmitted together with the trouble data about the copying machine in which the trouble has occurred is determined. As a result, the data about the copying machine which is scheduled to have regular maintenance in a near future can be transmitted to the computer 90 of the management center prior to other data. The management center can know which copying machine is scheduled to have maintenance in a near future. As a result, when a service engineer is dispatched to deal with the trouble which has occurred in one of the copying machines, the service engineer also can make maintenance for the other copying machine which is scheduled to have regular maintenance in a near future in this dispatch. This arrangement avoids the situation that the service engineer has to be dispatched many times.

In the case exemplified above, when the difference $\Delta C_2$ is the same as the difference $\Delta C_3$, the data about the copying machine 4*b* is transmitted to the computer 90 together with the trouble data about the copying machine 4*a*. It is also possible to make further detailed examination as to which data about the copying machine 4*b* or 4*c* is to be transmitted, taking into consideration the characteristics of each of the copying machines.

As described above in detail, in the copying machine management system according to the first embodiment, when a trouble has occurred in any one or more copying machines which are under control of the data terminal 1, the data terminal 1 transmits to the computer 90 of the management center the trouble data and the data about the copying machines in which no trouble has occurred. It is possible to collect the management data about each of the copying machines through one trouble transmission. As a result, the conditions of each of the copying machines can be managed in further detail. In addition, since the management data about each of the copying machines is transmitted through one trouble transmission, the fixed time transmission and the closing date transmission scheduled at the next time can be omitted. As a result, the number of communications can be reduced.

The data about the copying machines to be transmitted together with the trouble data are determined based on the count value remaining until the time for the next regular maintenance comes. As a result, the data about the copying machine which is scheduled to have regular maintenance in a near future can be transmitted to the computer 90 of the management center prior to other data. The management center can know which copying machine is scheduled to have maintenance in a near future. As a result, when a service engineer is dispatched to deal with the trouble which has occurred in one of the copying machines, the service engineer also can make maintenance for the other copying machine which is scheduled to have regular maintenance in a near future in this dispatch. This arrangement assuredly avoids the situation that the service engineer has to be dispatched many times.

Second Embodiment

Hereinafter, a second embodiment will be described. The system for managing copying machines according to the second embodiment basically has the same structure as of the management system according to the first embodiment. However, the second embodiment is different from the first embodiment in the transmission control of the data to the management center when a trouble has occurred in any one or more of the copying machines which are under control of the data terminal 1. Specifically, the second embodiment is different from the first embodiment in the transmission processing (S619) shown in FIG. 8. Therefore, another example of transmission processing will be described in the following description with reference to the flow chart of FIG. 10. The constituent elements identical to those of the first embodiment will be denoted by the same reference numerals, and their descriptions will be omitted. In addition, as is the case of the first embodiment, description will be made on the assumption that a trouble has occurred in the copying machine 4*a*.

When the CPU 11 of the data terminal 1 detects that a trouble has occurred in the copying machine 4*a*, it is recognized in S613 that the trouble transmission flag (Ta flag) is turned on. Then, the processing for phone call is performed (S615). After that, all the management data about the copying machines 4*b*, 4*c* are transmitted to the computer 90 of the management center, together with the trouble data about the copying machine 4*a* (S619). This processing is conducted under the conditions where the SRAM 15 of the data terminal 1 has a capacity enough to store all the data about the copying machines 4*a*, 4*b*, 4*c*, that is, this processing is the same as the transmission processing of the first embodiment in the case where the SRAM 15 has a sufficient capacity.

Next, description will be made on the transmission processing which is performed in the case where the SRAM 15 has only a small capacity and is not capable of storing all the management data about the copying machines 4*a*, 4*b*, 4*c*. This transmission processing of the second embodiment is different from that of the first embodiment.

When the SRAM 15 of the data terminal 1 has only a small capacity and is not capable of storing all the data about the copying machines 4*a*, 4*b*, 4*c*, the data about the copying machine which is to be transmitted is determined, based on the order of priorities about the maintenance of the copying machines, instead of the count number remaining until the time for the next regular maintenance comes. The order of priorities about the maintenance is determined in accordance with the characteristics of each of the copying machines.

Figure 10:
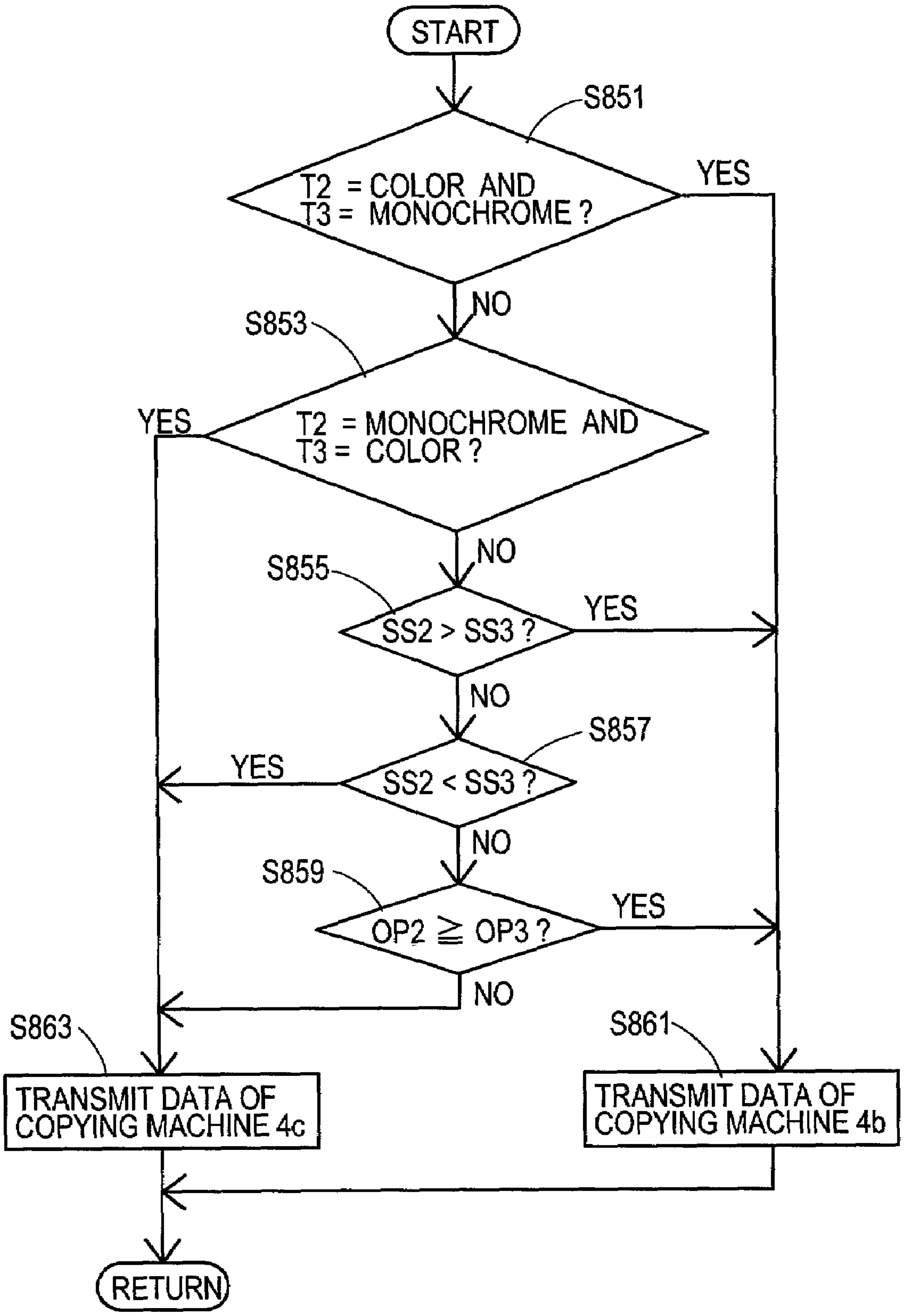
FIG. 10 is a flow chart illustrating the transmission control performed by the data terminal in a copying machine management system according to a second embodiment.

Specifically, as shown in FIG. 10, the CPU 11 of the data terminal 1 identifies the types of the copying machines 4*b*, 4*c* (i.e. whether they are color copying machine or monochrome copying machine) (S851, S853). When the type T2 of the copying machine 4*b* is a color type, and the type T3 of the copying machine 4*c* is a monochrome type (S851: Yes), the data about the copying machine 4*b* is transmitted to the computer 90 together with the trouble data about the copying machine 4*a* (S861). Contrarily, when the type T2 of the copying machine 4*b* is a monochrome type, and the type T3 of the copying machine 4*c* is a color type (S853: Yes), the data about the copying machine 4*c* is transmitted to the computer 90 together with the trouble data about the copying machine 4*a* (S863).

When the types T2, T3 of the copying machines 4*b*, 4*c* respectively are the same with each other (S851: No, S853: No), the data to be transmitted to the computer 90 together with the trouble data about the copying machine 4*a* is determined based on the system speed (S701, S703). When the system speed SS2 of the copying machine 4*b* is higher than the system speed SS3 of the copying machine 4*c* (S855: Yes), the data about the copying machine 4*b* is transmitted to the computer 90 together with the trouble data about the copying machine 4*a* (S861). Contrarily, when the system speed SS2 of the copying machine 4*b* is lower than the system speed SS3 of the copying machine 4*c* (S857: Yes), the data about the copying machine 4*c* is transmitted to the computer 90 together with the trouble data about the copying machine 4*a* (S863).

When the system speeds SS2, SS3 of the copying machines 4*b*, 4*c* respectively are also the same with each other (S855: No, S857: No), the data to be transmitted to the computer 90 together with the trouble data about the copying machine 4*a* is determined based on the number of optional devices that each of the copying machines 4*b*, 4*c* has (S859). When the number OP2 of the optional devices mounted to the copying machine 4*b* is larger than the number OP3 of the optional devices mounted to the copying machine 4*c* (S859: Yes), the data about the copying machine 4*b* is transmitted to the computer 90 together with the trouble data about the copying machine 4*a* (S861). Contrarily, when the number OP2 of the optional devices mounted to the copying machine 4*b* is smaller than the number OP3 of the optional devices mounted to the copying machine 4*c* (S859: No), the data about the copying machine 4*c* is transmitted to the computer 90 together with the trouble data about the copying machine 4*a* (S861).

As described above, the data about the copying machine which is to be transmitted to the computer 90 together with the trouble data about the copying machine in which the trouble has occurred is determined based on the characteristics of each of the copying machines, that is, based on the order of priorities of maintenance. In this manner, it is possible to assign higher priority to the data about the copying machine for which maintenance is much needed prior to other data, and to transmit such data to the computer 90 of the management center prior to other data. As a result, the management center can recognize beforehand whether or not each of the copying machines needs maintenance by the service engineer. When a service engineer is dispatched to deal with the trouble in one of the copying machines, it is also possible to make maintenance beforehand for the copying machine which needs maintenance. This arrangement eliminates the necessity of dispatching service engineers many times.

As described above in detail, in the copying machine management system according to the second embodiment, when a trouble has occurred in any one or more copying machines which are under control of the data terminal 1, the data terminal 1 transmits to the computer 90 of the management center the trouble data and the data about the copying machines in which no trouble has occurred. In this case, the data about the copying machine which has priority of maintenance higher than other copying machines is transmitted together with the trouble data to the computer 90 prior to the other data. The management center recognize whether or not the copying machine needs maintenance by the service engineers. As a result, when a service engineer is dispatched to deal with the trouble which has occurred in one of the copying machines, the service engineer also can make maintenance beforehand for the other copying machine which needs maintenance. This arrangement assuredly avoids the situation that the service engineer has to be dispatched many times.

The embodiments described above have been shown for the purpose of exemplification, and do not limit the present invention thereto. It would be obvious that various improvements and modifications of the present invention are possible without departing from the scope thereof. For example, although the telephone circuit CN has been exemplified as the communication method in the first and second embodiments, it is also possible to use other communication means such as packet communication by an internet or wireless communication by a portable telephone. In addition, on top of the management of copying machines, the present invention is also applicable to the management of other devices such as printers and the like.

In the embodiments described above, the latest data about the copying machines 4*a* to 4*c* are always stored in the SRAM 15 of the data terminal 1. When there arises the necessity for transmitting the data to the computer 90 of the management center, the data stored in the SRAM 15 is transmitted to the computer 90. As an alternative to this, the following arrangement is also possible in the present invention. That is, the latest data about the copying machines 4*a* to 4*c* are not stored in the SRAM 15. When it becomes necessary for transmitting data to the computer 90, data are obtained from the copying machines 4*a* to 4*c*. The obtained data are temporality stored in the SRAM 15, and the stored data are transmitted to the computer 90.

In the first embodiment described above, the total value $D_{i\text{-}sum}$ of the data collected from the copying machines 4*a* to 4*c* is calculated every time when data is updated in each of the copying machines 4*a* to 4*c*. The total value $D_{i\text{-}sum}$ is compared with a specified threshold value. In other words, the total value $D_{i\text{-}sum}$ is compared with the threshold value in the data terminal 1 whenever necessary. Alternatively, the following arrangement is also possible. That is, the data terminal 1 takes data from each of the copying machines 4*a* to 4*c* when it becomes necessary for transmitting data to the computer 90, and calculates the total value $D_{i\text{-}sum}$. Then, the total value $D_{i\text{-}sum}$ is compared with the specified threshold value. That is, the total value $D_{i\text{-}sum}$ is periodically compared with the threshold value in the data terminal 1.

What is claimed is:

1. An equipment management apparatus for transmitting management information collected from a plurality of equipment to a centralized management apparatus, comprising:

a detector for detecting a trouble which has occurred in a first image forming apparatus for forming an image on a sheet; and a transmission controller for, when the trouble is detected by the detector, transmitting management information about a second image forming apparatus for forming an image on a sheet, in which the trouble has not occurred and which is independent from the first image forming apparatus, together with the trouble information about the first image forming apparatus to the centralized management apparatus.

2. An equipment management apparatus according to claim 1, wherein the transmission controller responds to the detection of the trouble by the detector, and obtains the management information from the second image forming apparatus.

3. An equipment management apparatus according to claim 1, wherein the transmission controller transmits management information about a plurality of equipment including the second image forming apparatus.

4. An equipment management apparatus according to claim 3, further comprising a selector for selecting the second image forming apparatus among the plurality of equipment based on a specified condition.

5. An equipment management apparatus according to claim 4, wherein the specified condition is characteristics of each of the equipment, and the selector selects the second image forming apparatus based on the characteristics of each of the equipment.

6. An equipment management apparatus according to claim 1, further comprising a selector for selecting the second image forming apparatus among a plurality of equipment, based on at least one of the type of color of the second image forming apparatus, the speed of image formation thereof, and the equipment structure thereof.

7. An equipment management apparatus according to claim 1, wherein the equipment management apparatus is independently connected to the first image forming apparatus and the second image forming apparatus.

8. An equipment management apparatus for transmitting management information collected from a plurality of equipment to a centralized management apparatus, comprising:

a detector for detecting a trouble which has occurred in first equipment;

a transmission controller for, when the trouble is detected by the detector, transmitting management information about second equipment which is other than the first equipment together with the trouble information about the first equipment to the centralized management apparatus; and a selector for selecting the second equipment among the plurality of equipment based on a specified condition, wherein the specified condition is a period until the time for the next regular maintenance for each equipment comes, and the selector selects as second equipment the equipment whose time for the next regular maintenance is scheduled earlier than the times for the next regular maintenance for any other equipment.

9. An equipment management apparatus for transmitting management information collected from a plurality of equipment to a centralized management apparatus, comprising:

a first judging device for judging whether or not it is the time of transmitting information about first equipment;

a second judging device for judging whether or not it is the time of transmitting information about second equipment;

a priority determining controller for determining the order of priorities of the first and second equipment, based on the characteristics of each of the equipment; and a transmission controller for transmitting the information about the first and second equipment to the centralized management apparatus, in accordance with the order of priorities determined by the priority determining controller, when the first judging device judges that it is the time of transmitting the information about the first equipment, and the second judging device judges that it is the time of transmitting the information about the second equipment.

10. An equipment management apparatus according to claim 9, wherein the equipment is an image forming apparatus for forming an image on a sheet.

11. An equipment management apparatus according to claim 10, wherein the priority determining controller determines an order of priorities based on at least one of the type of color of the image forming apparatus, the speed of image formation thereof, and the apparatus structure thereof.

12. An equipment management system including an equipment management apparatus for transmitting management information collected from a plurality of equipment, and a centralized management apparatus for managing each of the plurality of equipment based on the management information transmitted from the equipment management apparatus, wherein the equipment management apparatus comprises:

a detector for detecting a trouble which has occurred in a first image forming apparatus for forming an image on a sheet; and a transmission controller for, when the trouble is detected by the detector, transmitting management information about a second image forming apparatus for forming an image on a sheet, in which the trouble has not occurred and which is independent from the first image forming apparatus, together with the trouble information about the first image forming apparatus to the centralized management apparatus are.

13. An equipment management apparatus according to claim 12, wherein the equipment management apparatus is independently connected to the first image forming apparatus and the second image forming apparatus.

14. An equipment management system including an equipment management apparatus for transmitting management information collected from a plurality of equipment, and a centralized management apparatus for managing each of the plurality of equipment based on the management information transmitted from the equipment management apparatus, wherein the equipment management apparatus comprises:

a first judging device for judging whether or not it is the time of transmitting information about first equipment;

a second judging device for judging whether or not it is the time of transmitting the information about second equipment;

a priority determining controller for determining an order of priorities of the first and second equipment, based on a characteristic of each of the equipment; and a transmission controller for transmitting the information about the first and second equipment to the centralized management apparatus, in accordance with the order of priorities determined by the priority determining controller, when the first judging device judges that it is the time of transmitting the information about the first equipment, and the second judging device judges that it is the time of transmitting the information about the second equipment.

15. An equipment management method in which one equipment management apparatus collects management information about a plurality of equipment, and the equipment management apparatus transmits the management information to a centralized management apparatus so as to manage the plurality of equipment, comprising steps of:

a step 1 of detecting a trouble which has occurred in a first image forming apparatus for forming an image on a sheet, by use of the equipment management apparatus; and a step 2 of transmitting management information about a second image forming apparatus, in which the trouble has not occurred and which is independent from the first image forming apparatus, from the equipment management apparatus to the centralized management apparatus together with the trouble information about the first image forming apparatus, when the trouble is detected in the step 1.

16. An equipment management method according to claim 15, wherein the equipment management apparatus is independently connected to the first image forming apparatus and the second image forming apparatus.

17. An equipment management method in which one equipment management apparatus collects management information about a plurality of equipment, and the equipment management apparatus transmits the management information to a centralized management apparatus so as to manage the plurality of equipment, comprising steps of:

a step of judging whether or not it is the time of transmitting information about first equipment from the equipment management apparatus;

a step of judging whether or not it is the time of transmitting the information about second equipment from the equipment management apparatus; and a step of transmitting the information about the first and second equipment from the equipment management apparatus to the centralized management apparatus, in accordance with the order of priorities based on the characteristics of each of the equipment, when it is judged that it is the time of transmitting the information about the first equipment, and it is judged that it is the time of transmitting the information about the second equipment.

* * * * *

UNITED STATES PATENT AND TRADEMARK OFFICE

CERTIFICATE OF CORRECTION

PATENT NO. : 7,653,717 B2
APPLICATION NO. : 09/810489
DATED : January 26, 2010
INVENTOR(S) : Atsushi Tomita It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1414 days.

Signed and Sealed this

Twenty-third Day of November, 2010

David J. Kappos
*Director of the United States Patent and Trademark Office*